Jan. 14, 1936.  J. SZAL  2,027,755

SYNCHRONIZING DEVICE FOR MACHINE GUNS ON AIRCRAFT

Filed March 2, 1935

Inventor:
Jan Szal
by P. Cowan
Attorney.

Patented Jan. 14, 1936

2,027,755

UNITED STATES PATENT OFFICE 2,027,755

SYNCHRONIZING DEVICE FOR MACHINE GUNS ON AIRCRAFT

Jan Szal, Warsaw, Poland

Application March 2, 1935, Serial No. 9,044
In Poland March 16, 1934

8 Claims. (Cl. 89—27)

The present invention relates to synchronizing devices for machine guns on aircraft.

The hitherto employed synchronizing devices for machine guns on aircraft necessitate the exercise of considerable force by the pilot, whilst at the same time they do not afford sufficient protection against the possibility of shooting through the propeller. The correct timing of the firing is likewise not always reliably effected.

The present invention aims at providing a synchronizing device which is free from the aforesaid defects.

The invention consists in a synchronizing device for machine guns on aircraft wherein on the shaft which drives the propeller a cam disc is mounted, which is exactly adjustable on the shaft in the direction of rotation thereof and which is arranged so as to be slidable thereon by means of helical cams, when the shaft is in a certain definite angular position, into an operative position in which the cam disc moves a push member and thereby a lever connected with the push member to-and-fro. By means of a link connected with the lever twice the number of to-and-fro movements are imparted to a second lever which on each of said movements causes the firing of a shot from the machine gun.

The force required for putting the device into action is very small, which is of great importance for correct aiming. The device operates, moreover, very reliably, inasmuch as the individual elements act positively on one another and the control is effected without the employment of any springs. In the event of the device becoming damaged the machine gun is automatically put out of operation. Furthermore, the firing angle can be adjusted within any desired limits, as a result of which the device can be employed even with machine guns which fire very rapidly.

Figure 1:
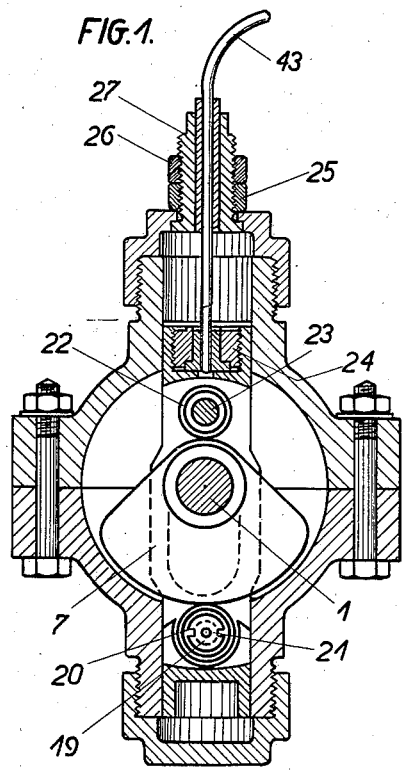
Figure 5:
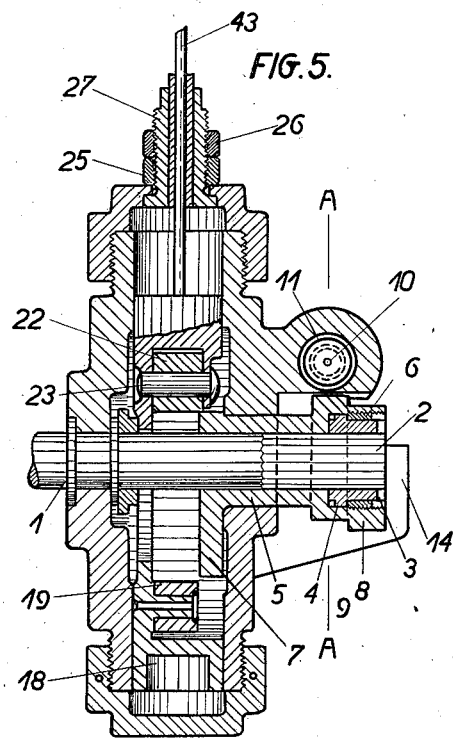
Figure 4:
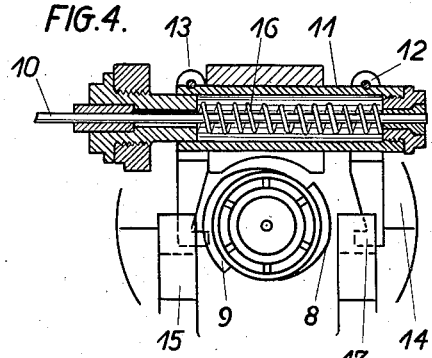
Figure 2:
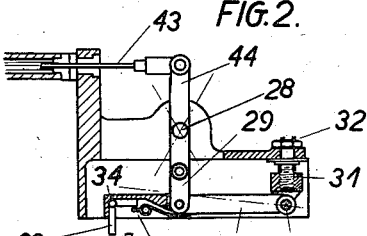
Figure 3:
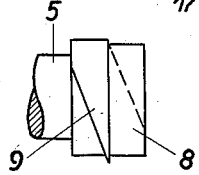
Figure 6:
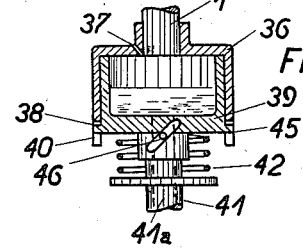

A preferred constructional form of a device according to the invention is illustrated by way of example in the accompanying drawing, in which:

Fig. 1 is a cross section through the device taken perpendicularly to the axis of the shaft, Fig. 2 is a vertical section through the release device for firing, Fig. 3 is a side view of the control cams, Fig. 4 is a section taken on the line A—A of Fig. 5, Fig. 5 is a section of the device taken in the plane of the axis of symmetry, and Fig. 6 shows the device for altering the firing angle in partial sectional elevation.

Referring to the drawing:

The motor or propeller shaft 1 is provided with teeth 2 (for example twenty-one teeth) on which the ring 3 is adapted to be axially slidable by the provision of the same number of internal teeth thereon. The ring 3, which is provided on its outer periphery with teeth 4, the number of which is different from that of the internal teeth, is mounted in a terminal extension of a cam sleeve 5 which is provided at this part with a corresponding number of internal teeth. The ring 3 is held in place by a ring nut 6.

The teeth of the shaft, the ring and the cam sleeve serve the purpose of rendering it possible to fix the cam disc 7 of the sleeve 5 in any desired position with regard to the shaft 1.

On the periphery of the sleeve 5 helical cams 8, 9 (Figs. 3 and 4) are arranged, the one (9) of said cams serving for putting the device out of operation and being directed towards the cam disc 7, whilst the other cam 8 serving for putting the device into operation is directed away from the cam disc 7, the arrangement being dependent on the direction of rotation of the shaft 1.

Above the cams 8 and 9 a tubular sleeve 11 connected to control arms 12, 13 is slidably mounted, with which sleeve a pull member 10 (Bowden cable) is operatively connected and which is constantly urged by an internal spring 16 into the right hand position (Fig. 4), namely the position in which the device is out of operation. The control arms 12, 13, which are slidable in recesses of the housing 14, are provided with terminal projections which are so directed that the arm 13, in consequence of its action on the cam 9, pushes the cam sleeve 5 into the inoperative position (Fig. 5), whereas when the Bowden cable 10 exerts a pull the projection 17 of the arm 12 acts on the cam 8, whereby the cam sleeve 5 is displaced towards the push member 18 into the operative position.

The push member 18 which is guided vertically in the housing is provided with two rollers 19 and 22. One of these rollers 19 is shorter than the other one and turns on a pin 20 integral with the push member 18, the said roller being secured against the possibility of its falling off by means of a screw 21. The second longer roller 22 is mounted on an axle 23 fixed in a fork of the push member 18. The rollers 19 and 22 are so arranged that the cam disc 7 acts in the inoperative position of the device (Fig. 5) on 22, but passes the roller 19 without action.

When the device is put into operation by a pull on the Bowden cable 10, the rotating cam disc 7 comes within the range of the angular position in which the cam of the cam disc 7 is in contact with the longer roller 22 between the rollers 19 and 22 and imparts to the push member 18 a movement to-and-fro. To the push member 18 a steel wire or rod 43 is attached by means of a nut 24, which wire or rod passes out through the sleeve 27 (which is fixed to the housing by means of nuts 25 and 26) and is guided over its whole length in a suitable sheath.

The wire or rod 43 is attached at its other end (Fig. 2) to a two-armed lever 44 pivoted at 28, the lower arm of which lever is connected by means of a link 29 with a one-armed lever 47 pivoted at 33. The pivot pin 30 which is mounted in a fork can be adjusted in its vertical position by means of a screw 31 secured by a nut 32.

As a result of this arrangement each to-and-fro movement of the push member 18 causes two upward and downward turning movements of the lever 47, which are transmitted to a projection 33 arranged on the lever 47. In each downward movement of the projection 33 the latter presses on the cock 48 of the machine gun and thereby causes the firing of a shot. It will be clear that each to-and-fro movement of the push member 18 corresponding to a complete revolution of the shaft or propeller always causes two firing operations in the machine gun.

In the case of synchronizing devices serving for the testing of munitions for the purpose of lessening the angle of spread, the lever 47 (Fig. 2) is provided with an angular projection 33 which is pivotally mounted at 34 and on the horizontal arm of which a spring 35 presses. The projection 33 is thus adapted to swing on one side when the cock 48 of the machine gun rises, without causing a shot to be fired.

With very high speeds of rotation of the propeller the firing angle becomes great in consequence of the transmission ratio of the device, from which it results that in this case three-bladed propellers, for example, cannot be employed in consequence of the danger of shooting through them. This drawback is eliminated by the aid of the device illustrated in Fig. 6 serving for the production of an acceleration of the firing operations in dependence on the speed of revolution of the propeller. On the shaft 1 of the synchronizing device a cylinder 36 provided with openings 37 and axial slits 38 is keyed. In this cylinder a hollow piston 39 is fitted having teeth 40 which are guided in slots 38 and which prevent rotation of the piston with regard to the cylinder 36. The piston 39 is rotatably mounted on the shaft 41, which is provided with a bore 41a. A pin 46 arranged on the hollow shaft 41 is guided in an inclined slot provided on the hub of the piston. On the shaft 41 a disc is mounted against which a spring 42, which presses upon the piston 39, bears.

Through the bore 41a of the shaft oil is introduced into the interior of the piston 39. In consequence of the centrifugal force arising in the piston during the rapid rotary movement, a high pressure is developed in the oil as a result of which the piston 39 is displaced against the action of the spring on the shaft 41. As a result of this a turning movement of the shaft 41 with regard to the driving shaft 1, i. e. an acceleration of the synchronizing device and therefore a diminution of the firing angle in relation to the speed of rotation of the propeller, is obtained.

I claim:

1. A synchronizing device for machine guns on aircraft, comprising in combination: a cam disc mounted on the propeller shaft and exactly adjustable thereon in the direction of rotation thereof; means for sliding said cam disc on the shaft into an operative position when the latter is in a certain definite angular position; a push member co-operating with said cam disc so as to move to-and-fro when the latter is in the operative position; a lever operatively connected with said push member so as to participate in the to-and-fro movements of the latter; a link member operatively connected to said lever; and a second lever operatively connected to said link and to the firing device of the machine gun, whereby twice the number of to-and-fro movements are imparted to the said firing device, each of said movements causing the firing of a shot.

2. A synchronizing device for machine guns on aircraft, comprising in combination: a cam disc mounted on the propeller shaft; means for accurately adjusting the said cam disc on the shaft in the direction of rotation thereof; helical cam members on the shaft co-operating with said cam disc to slide the latter on the shaft into an operative position when said cam disc is in a certain definite angular position; a push member operatively associated with said cam disc so as to be reciprocated thereby; a lever operatively connected to said push member so as to be reciprocated thereby; a second lever operatively connected to the firing device of the machine gun; and a link operatively connecting said two levers with one another, whereby twice the number of reciprocating movements are imparted to the said firing device, each of said movements causing the firing of a shot.

3. A synchronizing device for machine guns on aircraft, comprising in combination: a cam disc mounted on the propeller shaft; means for accurately adjusting the said cam disc on the shaft in the direction of rotation thereof; two helical cam members on the shaft co-operating with said cam disc to slide the latter on the shaft into and out of an operative position respectively when said cam disc is in a certain definite angular position; a push member operatively associated with said cam disc so as to be reciprocated thereby; a lever operatively connected to said push member so as to be reciprocated thereby; a second lever operatively connected to the firing device of the machine gun; a link operatively connecting said two levers with one another, whereby twice the number of reciprocating movements are imparted to the said firing device, each of said movements causing the firing of a shot; and slidably mounted control arms co-operating with said helical cam members, whereby when the end of the one of said control arms slides up against the one cam member the cam disc is displaced so as to put it out of operation and when the end of the other control arm slides up against the other cam member the cam disc is displaced so as to put it into operation.

4. A synchronizing device for machine guns on aircraft, comprising in combination: a cam disc mounted on the propeller shaft; means for accurately adjusting the said cam disc on the shaft in the direction of rotation thereof; two helical cam members on the shaft co-operating with said cam disc to slide the latter on the shaft into and out of an operative position respectively when said cam disc is in a certain definite angular position; a push member operatively associated with said cam disc so as to be reciprocated thereby; a lever operatively connected to said push member so as to be reciprocated thereby; a second lever operatively connected to the firing device of the machine gun; a link operatively connecting said two levers with one another, whereby twice the number of reciprocating movements are imparted to the said firing device, each of said movements causing the firing of a shot; and slidably mounted control arms co-operating with said helical cam members; means for imparting sliding motion to said control arms, whereby when the end of the one of said control arms slides up against the one cam member the cam disc is displaced so as to put it out of operation and when the end of the other control arm slides up against the other cam member the cam disc is displaced so as to put it into operation.

5. A synchronizing device for machine guns on aircraft, comprising in combination: a cam disc mounted on the propeller shaft; means for accurately adjusting the said cam disc on the shaft in the direction of rotation thereof; two helical cam members on the shaft co-operating with said cam disc to slide the latter on the shaft into and out of an operative position respectively when said cam disc is in a certain definite angular position; a push member operatively associated with said cam disc so as to be reciprocated thereby; a lever operatively connected to said push member so as to be reciprocated thereby; a second lever operatively connected to the firing device of the machine gun; a link operatively connecting said two levers with one another, whereby twice the number of reciprocating movements are imparted to the said firing device, each of said movements causing the firing of a shot; slidably mounted control arms co-operating with said helical cam members, whereby when the end of the one of said control arms slides up against the one cam member the cam disc is displaced so as to put it out of operation and when the end of the other control arm slides up against the other cam member the cam disc is displaced so as to put it into operation; a spring-controlled tube upon which said control arms are mounted; and a Bowden cable operatively connected to said tube to cause sliding movement thereof.

6. A synchronizing device for machine guns on aircraft, comprising in combination: a cam disc mounted on the propeller shaft; means for accurately adjusting the said cam disc on the shaft in the direction of rotation thereof; two helical cam members on the shaft co-operating with said cam disc to slide the latter on the shaft into and out of an operative position respectively when said cam disc is in a certain definite angular position; a push member operatively associated with said cam disc so as to be reciprocated thereby; a lever operatively connected to said push member so as to be reciprocated thereby; a second lever operatively connected to the firing device of the machine gun; a link operatively connecting said two levers with one another, whereby twice the number of reciprocating movements are imparted to the said firing device, each of said movements causing the firing of a shot; slidably mounted control arms co-operating with said helical cam members, whereby when the end of the one of said control arms slides up against the one cam member the cam disc is displaced so as to put it out of operation and when the end of the other control arm slides up against the other cam member the cam disc is displaced so as to put it into operation; a spring-controlled tube upon which said control arms are mounted; a Bowden cable operatively connected to said tube to cause sliding movement thereof; and two rollers co-operating with said push member, one of said rollers being so short that said cam disc when in the inoperative position does not act upon it.

7. A synchronizing device for machine guns on aircraft for munition tests for diminishing the angle of spread, comprising in combination: a cam disc mounted on the propeller shaft; means for accurately adjusting the said cam disc on the shaft in the direction of rotation thereof; two helical cam members on the shaft co-operating with said cam disc to slide the latter on the shaft into and out of an operative position respectively when said cam disc is in a certain definite angular position; a push member operatively associated with said cam disc so as to be reciprocated thereby; a lever operatively connected to said push member so as to be reciprocated thereby; a second lever operatively connected to the firing device of the machine gun; a link operatively connecting said two levers with one another, whereby twice the number of reciprocating movements are imparted to the said firing device, each of said movements causing the firing of a shot; slidably mounted control arms co-operating with said helical cam members, whereby when the end of the one of said control arms slides up against the one cam member the cam disc is displaced so as to put it out of operation and when the end of the other control arm slides up against the other cam member the cam disc is displaced so as to put it into operation; a spring-controlled tube upon which said control arms are mounted; a Bowden cable operatively connected to said tube to cause sliding movement thereof; two rollers co-operating with said push member, one of said rollers being so short that said cam disc when in the inoperative position does not act upon it; a spring controlled projecting member pivotally mounted on said second lever, whereby when the cock of the gun rises said projecting member is swung on one side without a shot being fired.

8. A synchronizing device for machine guns on aircraft for munition tests for diminishing the angle of spread, comprising in combination: a cam disc mounted on the propeller shaft; means for accurately adjusting the said cam disc on the shaft in the direction of rotation thereof; two helical cam members on the shaft co-operating with said cam disc to slide the latter on the shaft into and out of an operative position respectively when said cam disc is in a certain definite angular position; a push member operatively associated with said cam disc so as to be reciprocated thereby; a lever operatively connected to said push member so as to be reciprocated thereby; a second lever operatively connected to the firing device of the machine gun; a link operatively connecting said two levers with one another, whereby twice the number of reciprocating movements are imparted to the said firing device, each of said movements causing the firing of a shot; slidably mounted control arms co-operating with said helical cam members, whereby when the end of the one of said control arms slides up against the one cam member the cam disc is displaced so as to put it out of operation and when the end of the other control arm slides up against the other cam member the cam disc is displaced so as to put it into operation; a spring-controlled tube upon which said control arms are mounted; a Bowden cable operatively connected to said tube to cause sliding movement thereof; two rollers co-operating with said push member, one of said rollers being so short that said cam disc when in the inoperative position does not act upon it; a spring controlled projecting member pivotally mounted on said second lever, whereby when the cock of the gun rises said projecting member is swung on one side without a shot being fired; and a device interposed between two parts of the driving shaft and comprising a cylinder and a hollow piston slidable but not rotatable in said cylinder, said last named device containing oil in which at high speeds of revolution in consequence of the centrifugal force a high pressure arises which displaces said hollow piston and thereby causes a turning movement of the one part of the shaft relatively to the other part thereof whereby the firing angle is diminished as the propeller speed increases.

JAN SZAL.